Aug. 28, 1962 E. A. BRASS 3,051,533
RECIRCULATING LUBRICATION SYSTEM
Filed Aug. 2, 1961
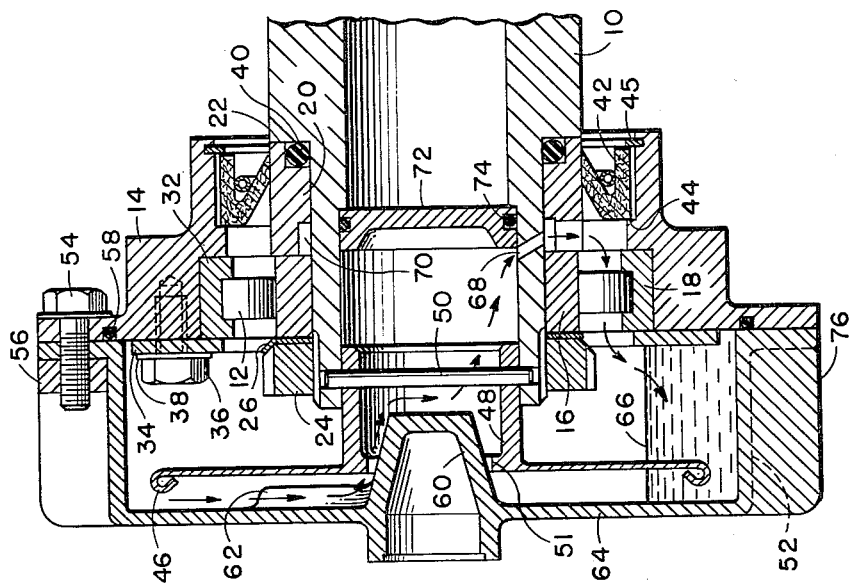
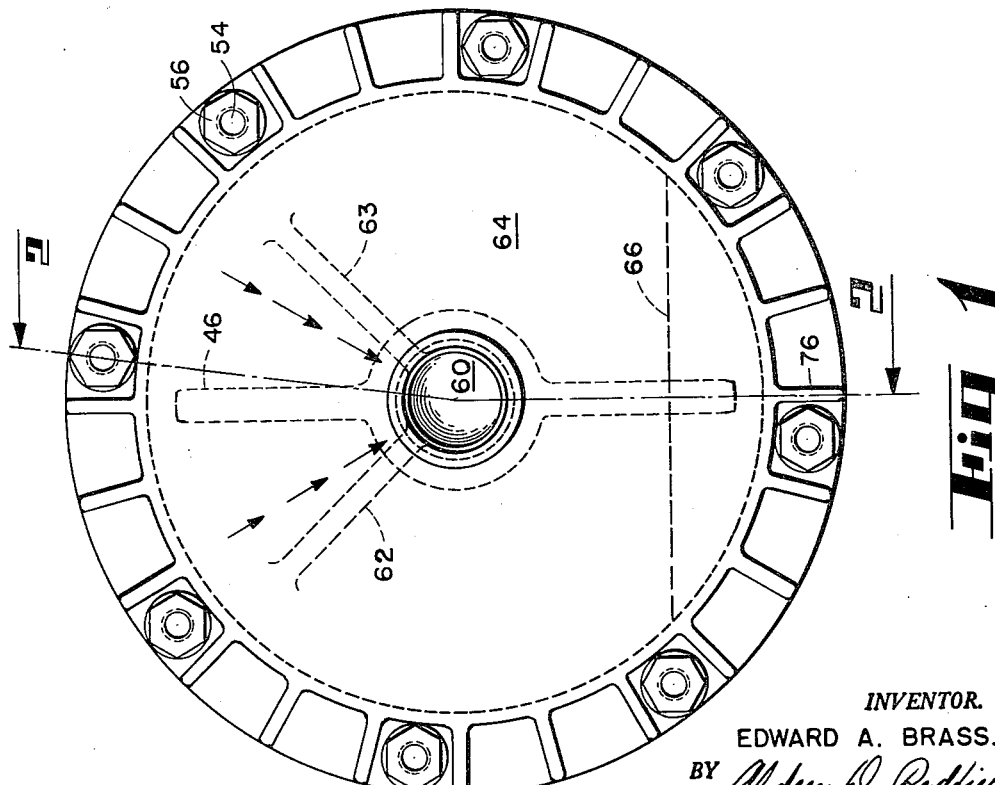
INVENTOR.
EDWARD A. BRASS.
BY
ATTORNEYS.

United States Patent Office 3,051,533
Patented Aug. 28, 1962

3,051,533
RECIRCULATING LUBRICATION SYSTEM
Edward A. Brass, Norwalk, Conn., assignor to Avco Corporation, Cincinnati, Ohio, a corporation of Delaware
Filed Aug. 2, 1961, Ser. No. 128,752
3 Claims. (Cl. 308—187)

This invention relates to a recirculating lubrication system for the bearings of a rotatable shaft and is particularly useful for the bearings located in a closed end housing at an end of a shaft. The particular device is intended for supporting the anti-drive end of the main shaft in an air compressor but is not limited thereto and may be used for many general applications.

Briefly described, I provide a shaft, at least one end of which is hollow, and I mount the shaft for rotation in suitable bearings. A closed end housing secured to the bearing support seals the end of the shaft and provides a reservoir for a lubricant. The end wall of the end housing is provided with a V-shaped trough which terminates in a centrally positioned conical deflector which extends into the hollow of the shaft. A pair of slingers is pinned to the rotating shaft and these serve, when rotated through the lubricant, to propel lubricant onto the end wall where at least some of the lubricant is caught within the trough. The lubricant then by gravity descends over the conical deflector into the hollow of the shaft where it is then centrifuged out through suitable holes in the shaft over the bearings and back to the reservoir.

An object of this invention is to provide a recirculating lubricating system in which lubricant for the bearings is provided by a combination of centrifugal force and gravity.

Another object of this invention is to provide a recirculating lubrication system in which oil is directed from a reservoir into a trough by means of centrifugal force, and then by means of gravity into the center of a rotating shaft and through the shaft bearings back to the reservoir.

Another object of this invention is to provide a recirculating lubrication system in which close tolerances are not required.

Another object of this invention is to provide a self-contained lubricating system in which the amount of lubricant delivered to the shaft bearings is governed by shaft speed.

For other objects and for a more detailed description of this invention, reference should now be made to the following detailed specification and to the accompanying drawings in which FIG. 1 is an end view of a preferred embodiment of my invention; and FIG. 2 is a cross-sectional view taken through the line 2—2 of FIG. 1.

In the drawings, a hollow cylindrical shaft 10 is mounted on roller bearings 12 within a centrally apertured bearing support housing 14. The end of the shaft 10 is reduced in diameter to provide a seat for the bearing races 16 and 18, and the inner race 16 is force fitted and locked in position against a retaining ring 20 which abuts the shoulder 22 on the shaft 10 by means of a nut 24 threaded onto the end of the shaft and a lockwasher 26. The outer race 18 is locked against a shoulder 32 in the support housing 14 by a bearing retaining ring 34 which is secured to the housing by a plurality of bolts 36 and washers 38.

Sealing between the housing 14 and the shaft 10 is provided in part by means of an O-ring 40 positioned in a suitable groove between the retaining ring 20 and the shoulder 22. The remainder of the seal is provided by means of a V-shaped sealing ring 42 secured in place against a lip 44 in the housing by means of a washer 45.

I also provide a slinger 46 supported from a hollow shaft 48 having an outer diameter approximately equal to the inner diameter of the end of the shaft 10. The shaft 48 is force fitted within the shaft 10 and is locked thereon and driven by means of a pin 50. The end of the shaft 48 adjacent the shaft 10 is open, but for a purpose to be described, the end adjacent the slinger is provided with a circumferential lip 51.

I secure a specially constructed end housing 52 to the outer periphery of the bearing support housing 14 by means of a plurality of bolts 54 and nuts 56, an O-ring 58 providing a seal between these components. The end housing 52 is provided with a central frustro-conical deflector 60 extending into the shaft 48 beyond lip 51. In addition, two walls 62 and 63, each disposed at an acute angle with respect to the vertical to form a V-shaped trough, extend from the end wall 64 of the end housing 52 and terminate at the deflector 60. A reservoir of lubricant 66 for the bearings partially fills the end housing 52.

The shaft 10 is provided with at least one hole 68 which communicates with an annular groove 70 in the retaining ring 20. In addition, an internal plug 72 and O-ring seal 74 provide a closure for the hollow shaft at a point just beyond the hole 68. Radial fins 76 are provided for cooling.

In operation the oil reservoir is provided in the end housing by filling the housing with lubricant 66 to at least the level where the slinger 46 is submerged when in a vertical position. When the slinger 46 is driven by the shaft 10, the lubricant 66 is centrifugally dispersed throughout the cavity of the end housing 52. Some of the lubricant collects on the interior of the housing end wall 64 and under the force of gravity moves downwardly into the trough formed by the walls 62 and 63. The lubricant is then directed onto the frustro-conical deflector 60 and since the deflector 60 is located concentrically with and protruding into the hollow slinger shaft 48, the lubricant is deflected into the shaft 48 and thence into the shaft 10. The lip 51 on the slinger shaft 48 provides a dam to prevent the lubricant from returning to the reservoir at this point. The lubricant flowing from the slinger shaft 48 collects in the hollow of the shaft 10 between the plug 72 and the shaft 48 and is then centrifuged out through the hole 68 and the groove 70. The lubricant then flows across the bearings 12 and through the aperture of the retaining ring 34 back to the reservoir.

Thus there has been produced a lubricating system which provides assured lubrication for all of the shaft bearings without the need for close tolerances between the parts. That is to say, with the slinger-trough arrangement it is hardly possible to avoid directing lubricant onto the frustro-conical deflector, and with the arrangement described, once oil leaves the deflector there is no path for the oil except over the bearings.

It is apparent that many modifications and adaptations will be available to those skilled in the art; for example, the slinger 46 may be made integral with the shaft 10, thus eliminating the need for the shaft 48 and 50. Furthermore, the invention will also be useful in connection with the lubrication of other types of bearings such as needle bearings, roller bearings, and sleeve bearings. For that reason, it is my intention that this invention be limited only by the following claims as interpreted in the light of the prior art.

I claim:

1. In a system for lubricating the bearings of a rotatably supported shaft, the combination comprising: a bearing support having an aperture for receiving said bearings, and end of said shaft being hollow and being rotatably mounted within said bearings; a lubricant dispersing element mounted on a second shaft positioned within the end of said hollow shaft, said second shaft being pinned to said hollow shaft for rotation therewith; an end housing connected to said bearing support to provide an enclosure for said end of said shaft and said dispersing element, said end housing having an end wall opposite the end of said shaft, said end wall having projections extending into said enclosure and forming a trough terminating in a deflector, said deflector extending into said end of said shaft; a reservoir of lubricant in said enclosure, said dispersing element extending from said second shaft and dipping into said reservoir; and a plurality of communicating passageways from the interior of said shaft through the walls of said shaft and over said bearings and back to said reservoir, whereby rotation of said shaft causes said dispersing element to centrifugally direct lubricant from said reservoir onto said end wall and whereby said lubricant thereafter gravity feeds along said trough and deflector into said hollow shaft and thereafter is centrifuged through said passageways and over said bearings and back to said reservoir.

2. In a bearing lubricating system, the combination comprising: a shaft having a hollow end; bearings for said end; a support for said bearings; an end housing providing an enclosure for said end of said shaft and said bearings, said end housing having an end wall opposite said end of said shaft; a lubricant reservoir in said enclosure, said reservoir being below said end of said shaft; lubricant propelling means mounted on said shaft and dipping into said lubricant reservoir for dispersing lubricant on said end wall when said shaft is rotating; projections on said end wall projecting into said enclosure above said shaft, said projections in combination with said end wall comprising a trough for collecting said dispersed lubricant from said wall and directing said lubricant by gravity into said hollow shaft; and communicating lubricant passages through said shaft and said support to provide passage for said lubricant over said bearings and back to said reservoir.

3. The invention as defined in claim 2 wherein said projections in combination with said end wall comprise projections into said enclosure forming a generally V-shaped trough terminating in a deflector, said deflector extending into said hollow shaft.

References Cited in the file of this patent

UNITED STATES PATENTS

| | | |
|---|---|---|
| 1,676,894 | Frank | July 10, 1928 |
| 2,241,870 | Scribner | May 13, 1941 |
| 2,911,267 | Small | Nov. 3, 1959 |